US008683338B2

(12) United States Patent
Suzuki et al.

(10) Patent No.: US 8,683,338 B2
(45) Date of Patent: Mar. 25, 2014

(54) INFORMATION PROCESSING DEVICE

(75) Inventors: Masashi Suzuki, Aichi (JP); Yukimasa Yoshida, Aichi (JP); Kiyotaka Ohara, Aichi (JP); Hidenori Hisada, Aichi (JP); Shougo Sato, Aichi (JP); Ryota Kato, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 352 days.

(21) Appl. No.: 12/076,480

(22) Filed: Mar. 19, 2008

(65) Prior Publication Data
US 2008/0244411 A1  Oct. 2, 2008

(30) Foreign Application Priority Data

Mar. 29, 2007  (JP) ................ 2007-088602

(51) Int. Cl.
*G06F 15/16* (2006.01)
*G06F 3/00* (2006.01)

(52) U.S. Cl.
USPC ............. 715/730; 705/59; 709/203; 709/248

(58) Field of Classification Search
USPC ........................................ 709/205
See application file for complete search history.

(56) References Cited

U.S. PATENT DOCUMENTS

| 6,654,785 | B1* | 11/2003 | Craig ............................ 709/203 |
| 2002/0087435 | A1* | 7/2002 | Neishi et al. .................... 705/27 |
| 2002/0184312 | A1* | 12/2002 | Chen et al. ..................... 709/205 |
| 2003/0200553 | A1 | 10/2003 | Cole et al. |
| 2004/0143603 | A1* | 7/2004 | Kaufmann et al. ........ 707/104.1 |
| 2004/0205575 | A1* | 10/2004 | Wattenberg ................... 715/513 |

FOREIGN PATENT DOCUMENTS

| JP | 2000-066968 | 3/2000 |
| JP | 2002-170070 | 6/2002 |
| JP | 2006-507559 | 3/2006 |

OTHER PUBLICATIONS

Japanese Official Action dated May 10, 2011 together with an English language translation from JP 2007-088602.

* cited by examiner

*Primary Examiner* — Andrew Goldberg
(74) *Attorney, Agent, or Firm* — Scully, Scott, Murphy & Presser, P.C.

(57) ABSTRACT

There is provided an information processing device, comprising: a display unit configured to display at least one of a plurality of data files; an information providing unit configured to transmit, to a host computer, first information enabling a client device accessing the host computer to display information contained in the first information; a display switch unit configured to switch onscreen representation on the display unit between images corresponding to the plurality of data files; and a data changing unit configured to transmit, to the host computer, second information concerning an image corresponding to one of the plurality of data files currently displayed on the display unit in response to a fact that the onscreen representation on the display unit is switched.

5 Claims, 11 Drawing Sheets

```
<html>
<head>
<meta http-equiv="refresh" content="60">
<title>Patent</title>
</head>
<body>
<img src="filmslide.jpg">
</body>
</html>
```

FIG.10

```
<html>
<head>
<meta http-equiv="refresh" content="60">
<title>Patent</title>
</head>
<body>
<img src="filmslide3.jpg">
</body>
</html>
```

FIG.11

INFORMATION PROCESSING DEVICE

CROSS-REFERENCE TO RELATED APPLICATION

This application claims priority under 35 U.S.C. §119 from Japanese Patent Application No. 2007-088602, filed on Mar. 29, 2007. The entire subject matter of the application is incorporated herein by reference.

BACKGROUND

1. Technical Field

Aspects of the present invention relate to an information processing device used to provide information (e.g., presentation materials) for client devices.

2. Related Art

In general, when a presenter gives a lecture while presenting a slide show of presentation materials, a PC (Personal Computer) in which image files of the presentation materials are stored is connected to a wide screen placed on a presenter's platform. In the case where a large conference room is used for the lecture, a WWW server containing the image files of the presentation materials is installed for the lecture so that participants sitting on sheets on a rear side where the participants hardly recognize visibly contents displayed on the wide screen can connect their portable devices to the WWW server to brows the image files stored in the WWW server through the participant's portable devices. In this case, the participant is able to listen to the lecture while browsing the image files of the presentation materials through the participant's portable device. An example of such a system is disclosed in Japanese Patent Provisional Publication No. 2002-170070.

SUMMARY

However, in the above mentioned system, the participant needs to manually operate the participant's portable device to switch to a desired image which matches a slide currently displayed on the wide screen by the presenter. Therefore, the participant may fail to switch to a proper image, for example, when the participant considerably focuses on the presenter's lecture. In this case, the image files of the presentation materials can not be effectively utilized by participants.

Aspects of the present invention are advantageous in that at least an information processing device capable of properly providing image files corresponding to presentation materials for participants of an event is provided.

According to an aspect of the invention, there is provided an information processing device, comprising: a display unit configured to display at least one of a plurality of data files; an information providing unit configured to transmit, to a host computer, first information enabling a client device accessing the host computer to display information contained in the first information; a display switch unit configured to switch onscreen representation on the display unit between images corresponding to the plurality of data files; and a data changing unit configured to transmit, to the host computer, second information concerning an image corresponding to one of the plurality of data files currently displayed on the display unit in response to a fact that the onscreen representation on the display unit is switched.

Since the second information is transmitted to the host computer in response to a fact that the onscreen representation on the display unit is switched, it is possible to enable the client device to automatically switch images displayed on the client device in accordance with the onscreen representation of the information processing device.

According to another aspect of the invention, there is provided a method to be implemented on an information processing device, comprising the steps of: controlling a display unit of the information processing device to display at least one of a plurality of data files; transmitting, to a host computer, first information enabling a client device accessing the host computer to display information contained in the first information; switching onscreen representation on the display unit between images corresponding to the plurality of data files; and transmitting, to the host computer, second information concerning an image corresponding to one of the plurality of data files currently displayed on the display unit in response to a fact that the onscreen representation on the display unit is switched.

Since the second information is transmitted to the host computer in response to a fact that the onscreen representation on the display unit is switched, it is possible to enable the client device to automatically switch images displayed on the client device in accordance with the onscreen representation of the information processing device.

According to another aspect of the invention, there is provided a computer readable medium having computer readable instruction stored thereon, which, when executed by a processor of an information processing device, configures the processor to perform the steps of: controlling a display unit of the information processing device to display at least one of a plurality of data files; transmitting, to a host computer, first information enabling a client device accessing the host computer to display information contained in the first information; switching onscreen representation on the display unit between images corresponding to the plurality of data files; and transmitting, to the host computer, second information concerning an image corresponding to one of the plurality of data files currently displayed on the display unit in response to a fact that the onscreen representation on the display unit is switched.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 10 illustrates an example of an HTML file according to the first embodiment.

FIG. 11 illustrates an example of an HTML file according to the second embodiment.

DETAILED DESCRIPTION

Hereafter, embodiments according to the invention will be described with reference to the accompanying drawings.

First Embodiment

Figure 1:
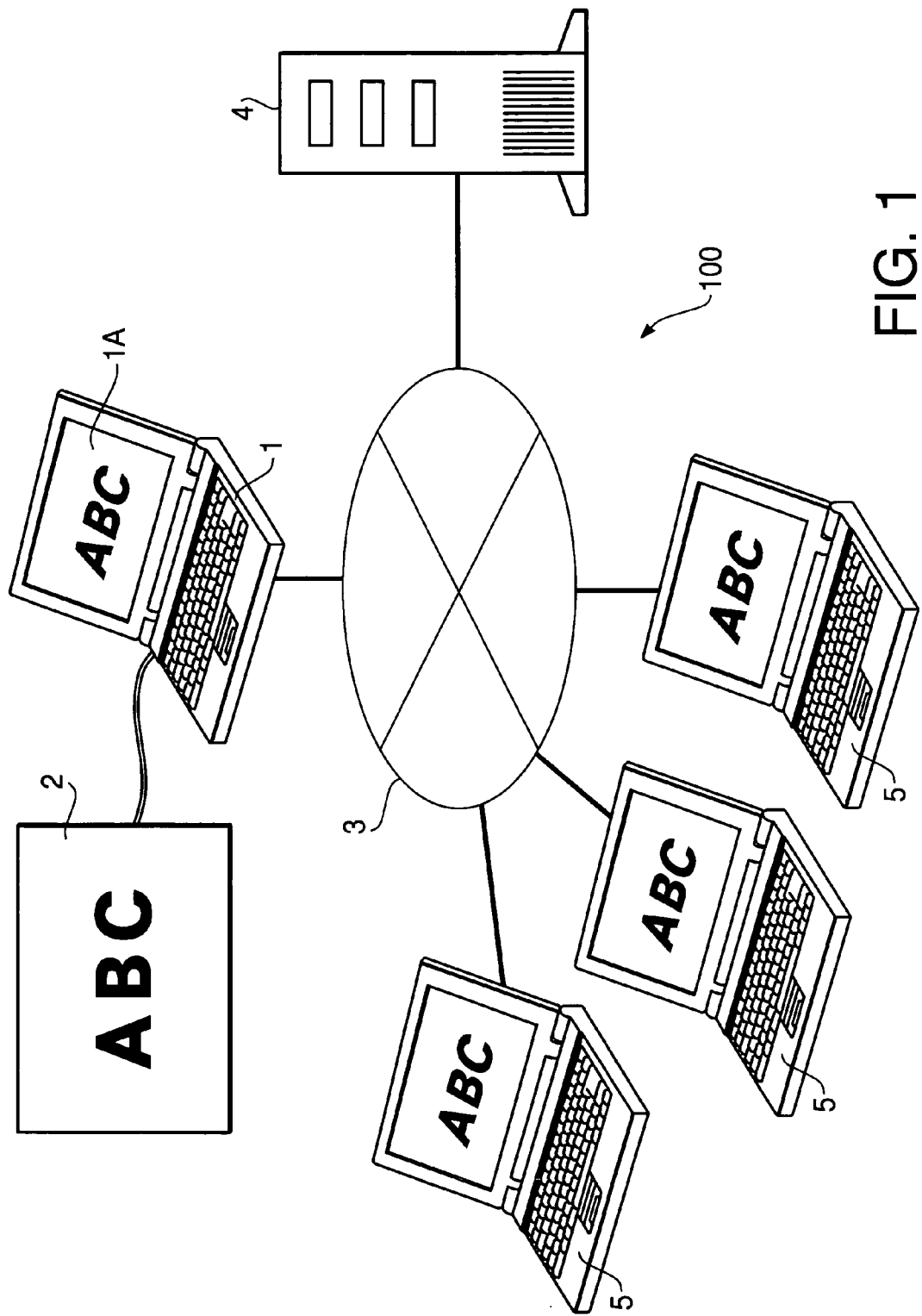
FIG. 1 illustrates an example of a system configuration where an information processing device according to a first embodiment is used.

FIG. 1 illustrates a presentation system 100 where an information processing device 1 according to a first embodiment is used. The information processing device 1 (e.g., a notebook computer) is used by a presenter to make a presentation. The information processing device 1 is placed, for example, on a presenter's platform. Hereafter, the information processing device 1 is referred to as a presenter's device 1 for the sake of convenience. To the information processing device 1, a display device having a large screen 2 is connected so that the same image as that displayed on a LCD 1A of the information processing device 1 can be displayed on the screen 2.

In the following, it is assumed that the presentation system 100 shown in FIG. 1 is used in a large conference room where participants sitting on rear side sheets hard to visually recognize contents on the screen 2.

In the presenter's device 1, presentation software for displaying slides of representation materials formed, for example, as data files of power Point® provided by Microsoft® is installed. In the presenter's device 1, a FTP (File Transfer Protocol) function is also installed so that the presenter's device 1 is able to transmit files stored therein to an external device (e.g., a host computer 4) via a network (e.g., Internet 3).

In the conference room, participants having their information processing devices 5 (e.g., a notebook computer or a PDA) sit on there seats. Hereafter, the information processing device 5 of a participant is referred to as a client device 5. As shown in FIG. 1, by connecting the client device 5 to the host computer 4 through the Internet 3, images of the presentation materials which are displayed on the screen 2 can also be displayed on the client device 5. That is, each participant is able to brows images of the presentation materials on the client device 5.

As described in detail below, the presenter's device 1 transmits image files of the presentation materials to the host computer 4 having a function as a web server so that the client device 5 is able to brows the presentation materials by accessing the host computer 4. During the presentation, when the presenter switches onscreen representation from a first image (IM1) to a second image (IM2), onscreen representation of each client device 5 is also automatically switched from the image IM1 to the image IM2. To achieve such a function, software (a presentation showing process) for switching the onscreen representation of each client device 5 in accordance with transition of the onscreen representation of the slides displayed on the screen 2 is installed into the presenter's device 1. Hereafter, functions implemented on the presenter's device 1 to switch the onscreen representation both on the presenter's device 1 and each client device 5 is explained.

The presenter's device 1 has a general configuration as a notebook computer in which a CPU, a ROM, a RAM, a storage device (e.g., an HDD), a keyboard, a pointing device (e.g., a mouse) and a network interface for interfacing the presenter's device 1 to a network are provided. By executing software on the presenter's device 1, various functional units can be implemented on the presenter's device 1. The host computer 4 has a general configuration as a desktop computer in which a CPU a ROM, a RAM, a storage device (e.g., an HDD), a keyboard, a pointing device (e.g., a mouse) and a network interface for interfacing the host computer 4 to a network are provided. By executing software on the host computer 4, various functional units can be implemented on the host computer 4.

Figure 2:
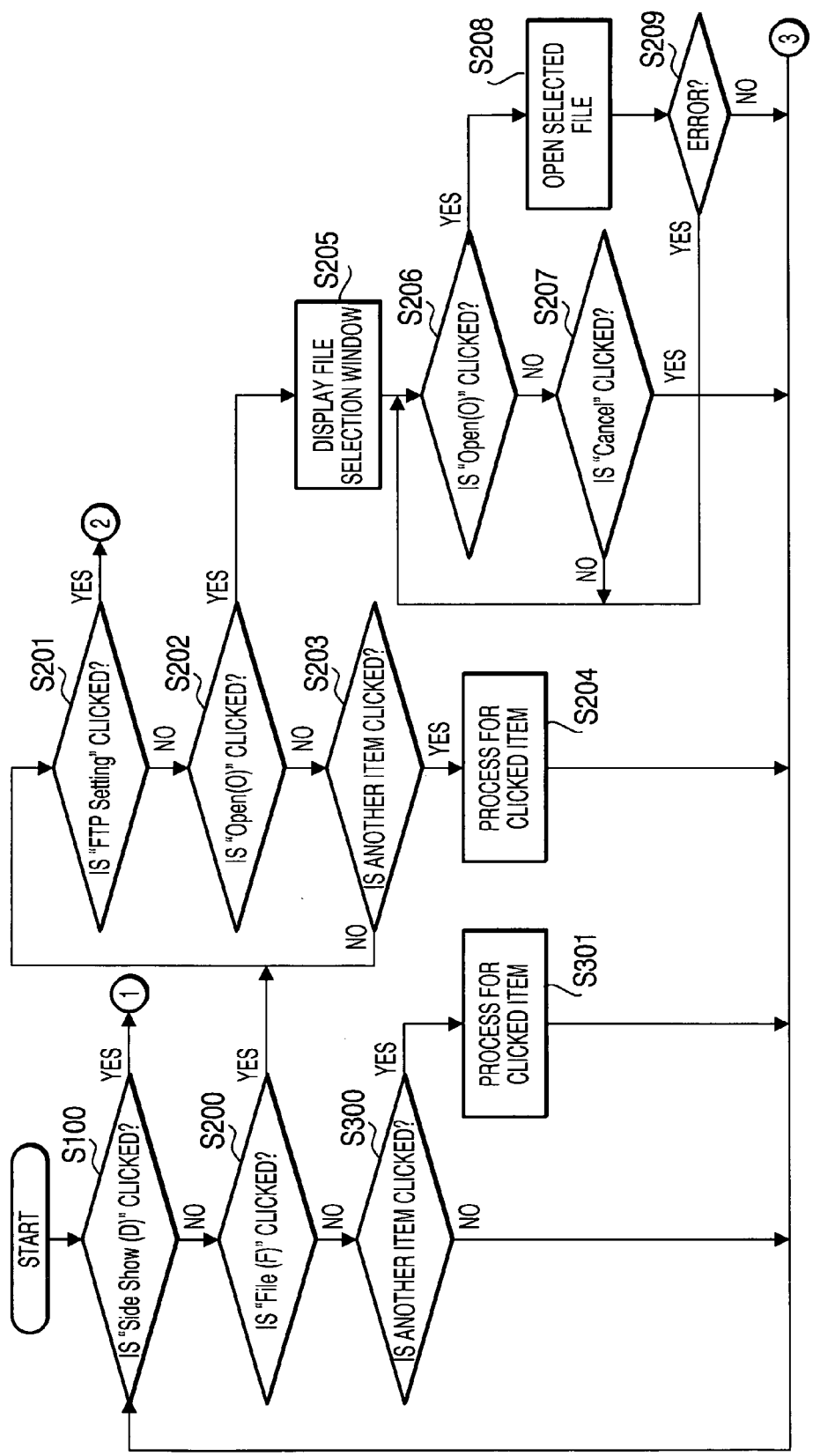
FIGS. 2 and 3 illustrate a flowchart of a preparation process for execution of a presentation showing process.
Figure 3:
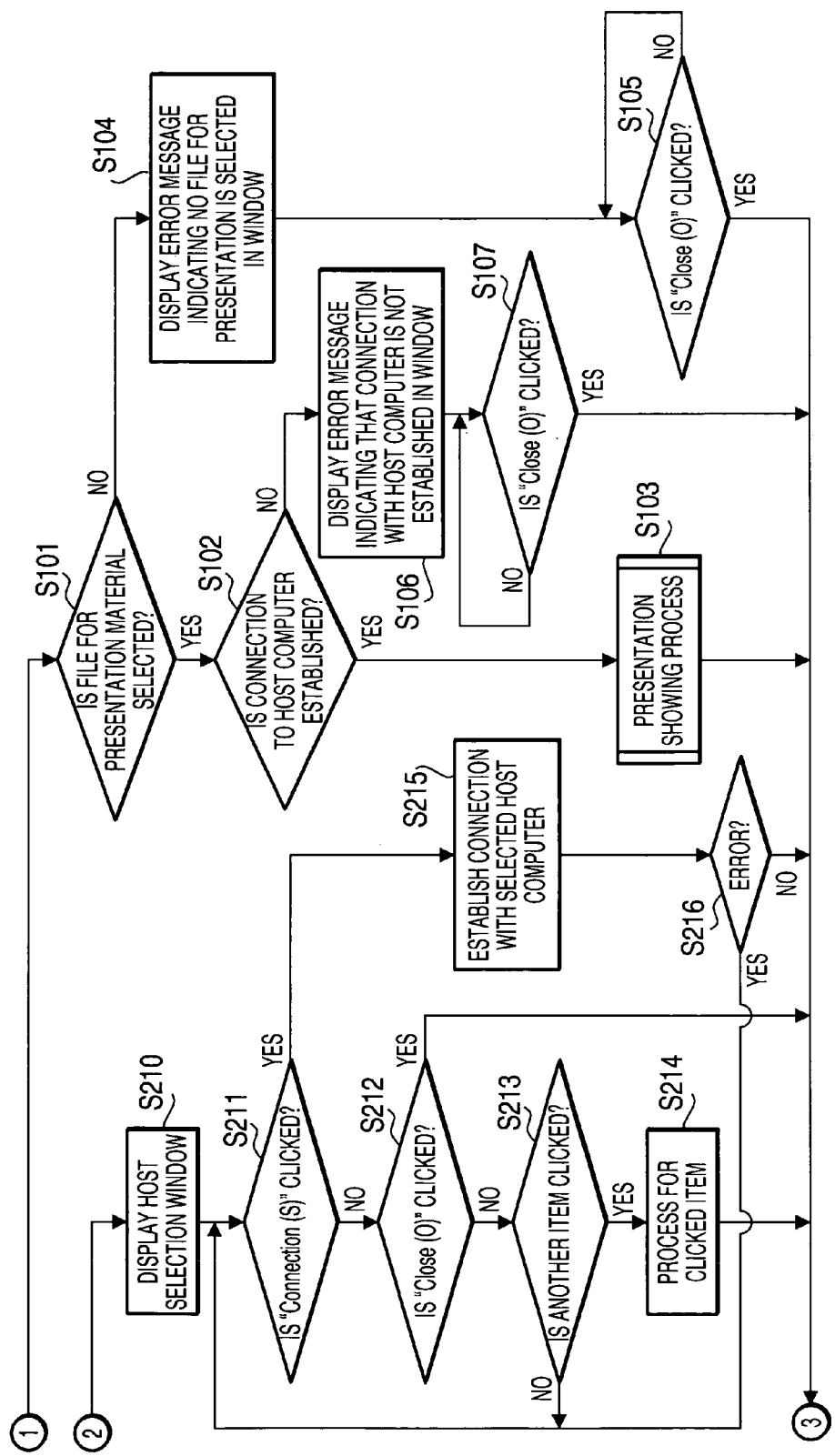
Figure 6:
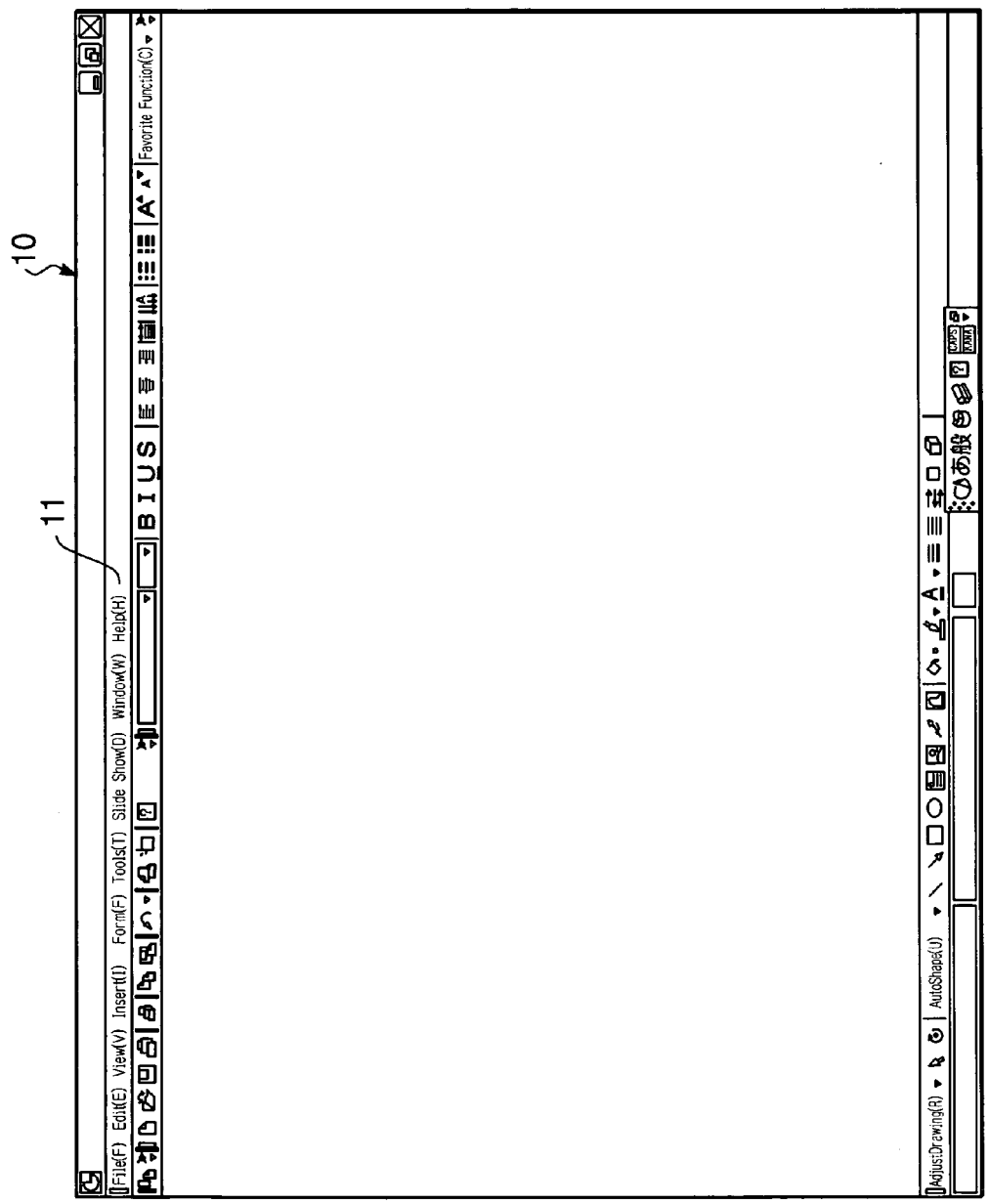
FIG. 6 illustrates a start screen displayed on a presenter's device.

FIGS. 2 and 3 illustrate a flowchart of a preparation process for preparing the presentation. The preparation process is executed under control of the CPU of the presenter's device 1. When the presenter turns the presenter's device 1 to ON and starts the presentation software by selecting an item of the presentation software from a start menu, the preparation process is started and a start screen 10 shown in FIG. 6 is displayed.

To make a presentation, the presenter clicks an item "Slide Show (D)" in a menu bar 11 (S100: YES). By clicking the item "Slide Show (D)", the presenter is able to execute the presentation showing process (step S103). However, first, a preparation operation for the presentation is conducted. The preparation operation is conducted by clicking an item "File (F)" in the menu bar 11 (S200: YES). On the other hand, if another item is clicked (S200: NO and S300: YES), a process for the clicked item is executed in step S301. If no action is made by the presenter (S100: NO, S200: NO and S300: NO), the presenter's device 1 waits until an item is clicked.

Figure 7:
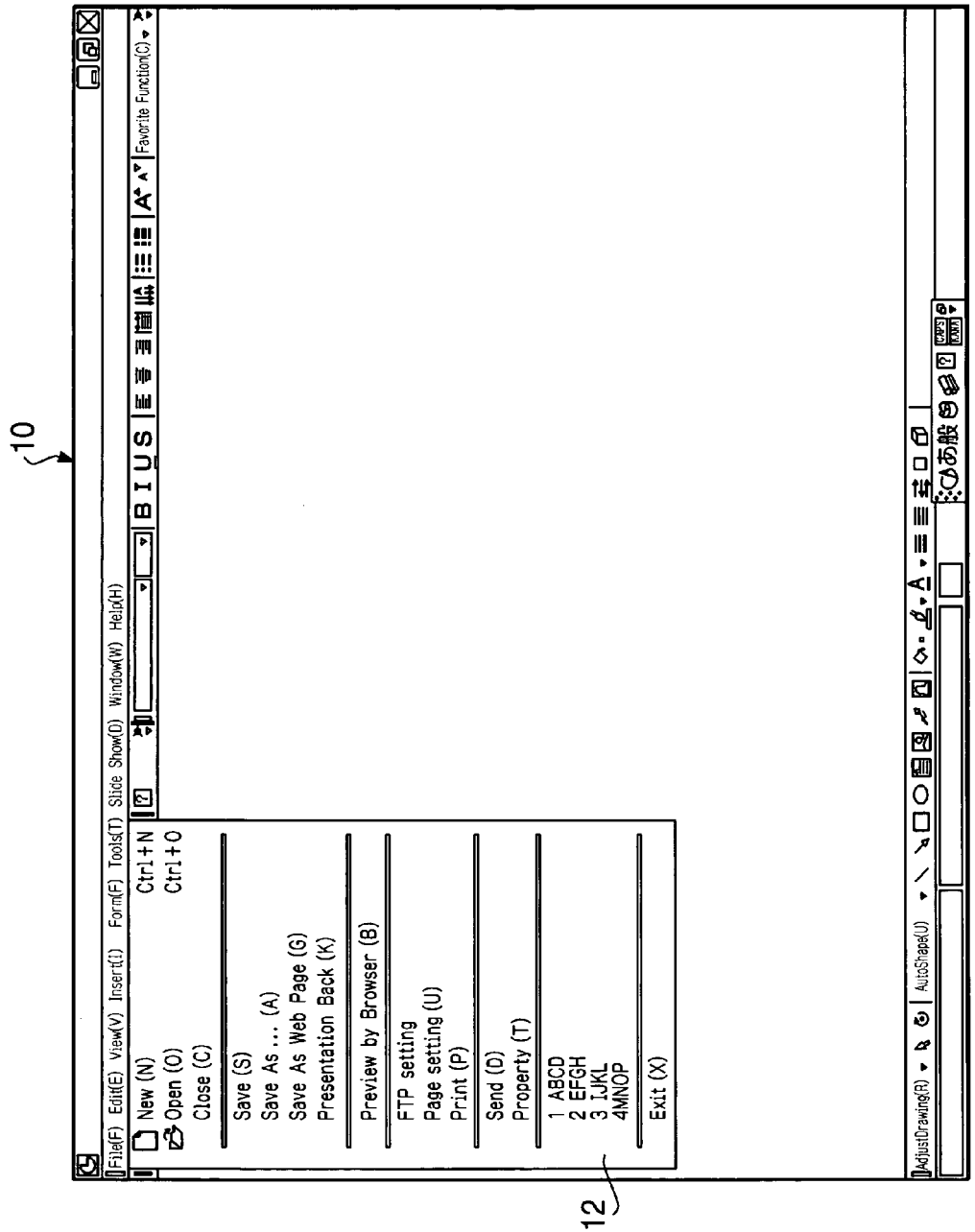
FIG. 7 illustrates a pull-down menu displayed on the start screen.

If the item "File (F)" is clicked (S200: YES), a pull-down menu 12 is displayed on the start screen 10 (see FIG. 7) and control proceeds to step S201. If no action is made by the presenter (S201: NO, S202: NO and S203: NO), the presenter's device 1 repeats steps S201 to S203 to wait for an action of the presenter. An item other than "FTP setting" and "Open (O)" is clicked (S203: YES), the presenter's device 1 executes a process for the clicked item in step S204.

Figure 8:
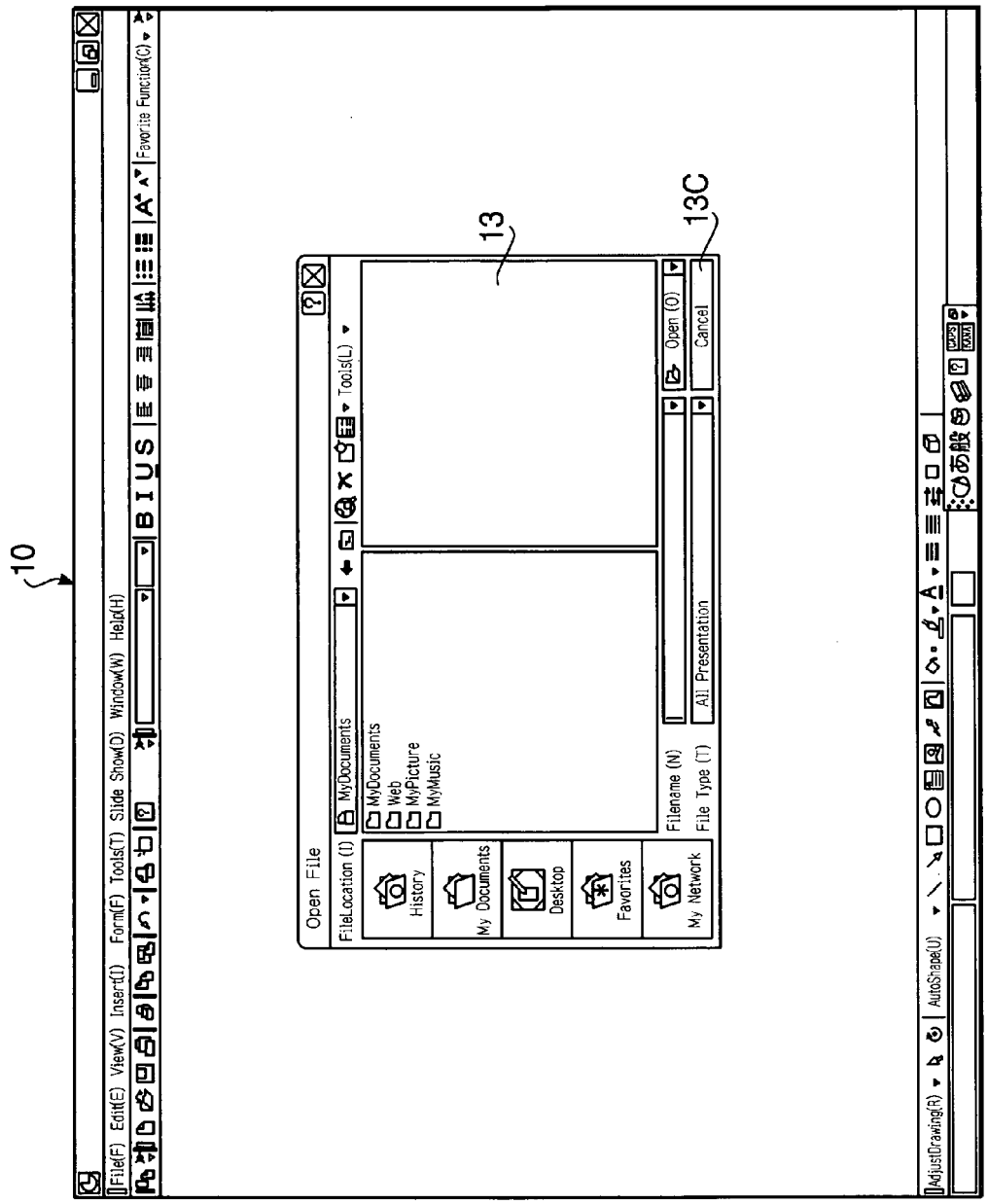
FIG. 8 illustrates a file selection window displayed on the start screen.

If the item "Open (O)" is clicked on the pull-down menu 12 (S202: YES), a file selection window 13 (see FIG. 8) indicating file locations is displayed to request a user to select a file storing data of the presentation materials (step S205). If a "Cancel" button 13C is clicked on the file selection window 13 (S206: NO and S207: YES), the file section window 13 is closed and the onscreen representation returns to the start screen 10. If no item is clicked (S206: NO and S207: NO), the presenter's device 1 repeats steps S206 and S207 to wait for an action.

It is assumed that image files of the presentation materials are stored in a "My Documents" holder. In this case, an item "My documents" is selected as a file location of the presentation material on the file selection window 13. If the item "My Documents" is selected and then an item "Open (O)" is clicked (S206: YES), an image file of the presentation material stored in the "My Documents" holder is opened (step S208).

If the selected file is broken or the selected file does not have a predetermined file format, the presenter's device 1 judges that an error occurs (S209: YES). In this case, control returns to step S206 to allow a user to select a file again. If the selected file is successfully read (S209: NO), the onscreen representation returns to the start screen 10.

Figure 9:
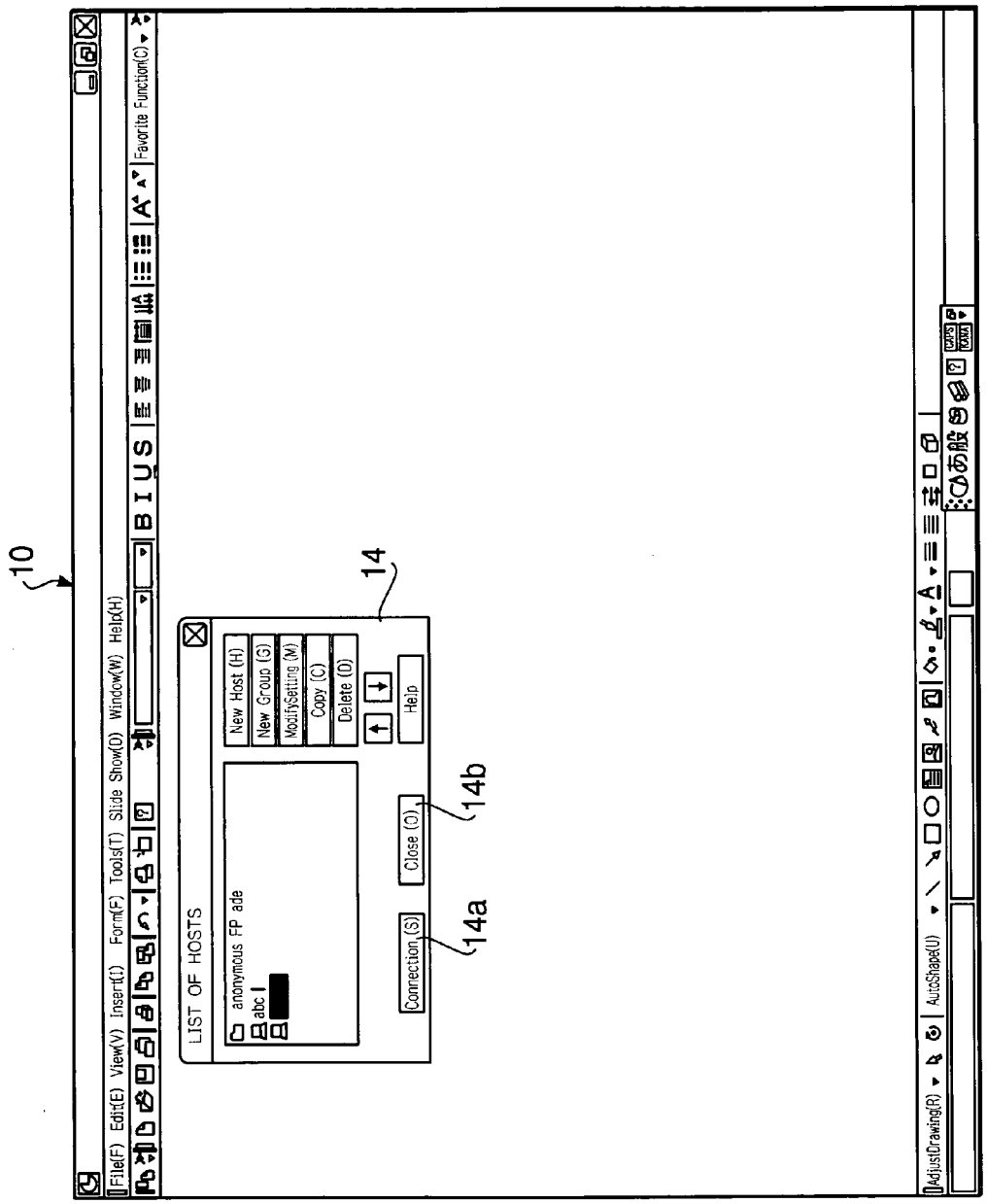
FIG. 9 illustrates a host selection window displayed on the start screen.

After the image file of the presentation material is thus selected, the FTP setting is conducted. In this case, the presenter clicks the item "File (F)" in the menu bar 11 (S200: YES). On the start screen 10, the pull-down menu 12 is displayed. Then, the presenter clicks the item "FTP setting" (S201: YES). Then, a host selection window 14 for selecting a host computer is displayed (see FIG. 9) (step S210).

If a button "Close (O)" 14b is clicked on the host selection window 14 (S211: NO and S212: YES), the host selection window 14 is closed, and the onscreen representation returns to the start screen 10. If no action is made after the host selection window 14 is opened (S211: NO, S212: NO and S213: NO), the presenter's device 1 repeats steps S211 to S213 to wait for an action. If a button other than a button "Connection (S)" 14a and the button "Close (O)" 14b is clicked (S213: YES), a process for the selected button is executed in step S214. After the process of step S214 is finished, the onscreen representation returns to the start screen 10 to wait for an action.

If the host computer 4 is selected and the button "Connection (S)" 14a is clicked (S211: YES), connection between the presenter's device 1 and the selected host computer (e.g., the host computer 4) is established (step S215). If the presenter's device 1 judges that the connection between the presenter's device 1 and the host computer 4 can not be established due to network trouble (S216: YES), control returns to step S211 to wait for an action. If the connection between the presenter's device 1 and the host computer 4 can be established successfully (i.e., no error occurs) (S216: NO), the onscreen representation returns to the start screen 10 shown in FIG. 6.

After the reading of the image files for the presentation materials and the preparation of connection to the host computer 4 are finished, execution of the presentation becomes possible. In this state, when the item "Slide Show (D)" in the menu bar 11 is clicked (S100: YES), the presenter's device 1 checks whether the connection to the host computer has been established (step S102). If the connection to the host computer has been established (S101: YES, S102: YES), control proceeds to step S103 where the presentation showing process is executed.

If the item "Slide Show (D)" is clicked in the state where no file for the presentation materials is selected (S101: NO), an error message indicating that no file for the presentation material is selected is displayed in a form of a window (step S104). In this case, selection of a file of the presentation material is required. Therefore, the presenter's device 1 waits until the item "Close (O)" is clicked (step S105). The onscreen representation returns to the start screen 10 shown in FIG. 6 after the item "Close (O)" is clicked (S105: YES).

If the item "Slide Show (D)" is clicked in the state where connection to the host computer 4 is not established (S102: NO), an error message indicating that connection with the host computer is not established is displayed in a form of a window (step S106). In this case, selection of a file of the presentation material is required. Therefore, the presenter's device 1 waits until the item "Close (O)" is clicked (step S107). The onscreen representation returns to the start screen 10 shown in FIG. 6 after the item "Close (O)" is clicked (S107: YES). If the file of the presentation materials is selected and the connection with the host computer 4 is established (S101: YES and S102: YES), control proceeds to step S103 where the presentation showing process is executed.

Figure 4:
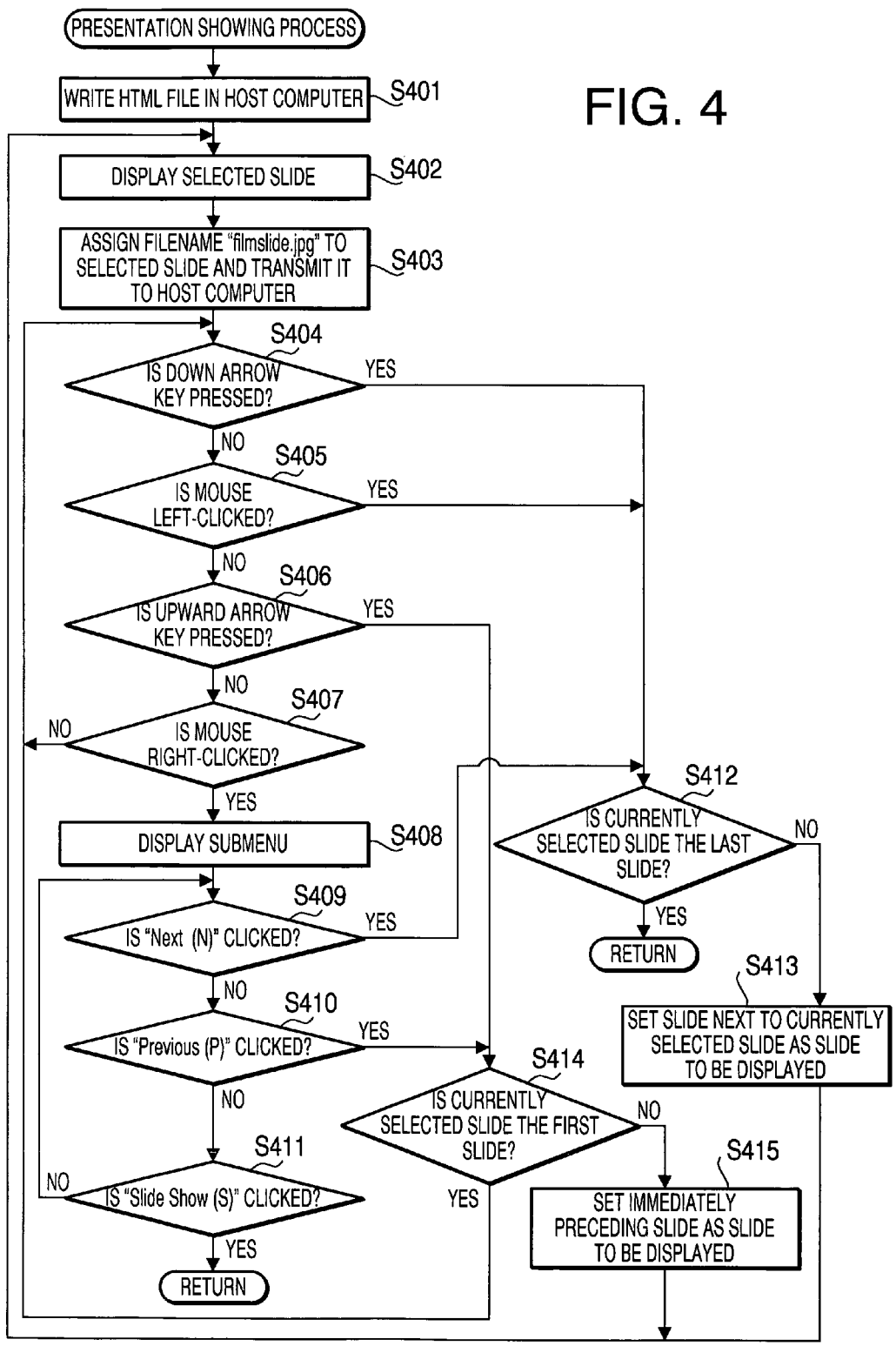
FIG. 4 is a flowchart illustrating the presentation showing process according to the first embodiment.

Hereafter, the presentation showing process is explained with reference to FIG. 4. The presentation showing process is executed under control of the CPU of the presenter's device 1. As described in detail below, in the presentation showing process, one of image files forming the presentation materials (the slides) is displayed on the presenter's device 1 and the same image as that displayed on the presenter's device 1 is displayed on the screen 2. The displayed image of the presenter's device 1 (i.e., the screen 2) is switched in accordance with the progress of the presentation. In the presentation showing process, the presenter's device 1 transmits the image files to the host computer 4 so that each client device 5 is able to brows the image of the image file transmitted to the host computer 4.

First, the presenter's device 1 transmits an HTML file to the host computer 4 (step S401). An example of the HTML file transmitted to the host computer 4 in step S401 is shown in FIG. 10. The HTML file is formed by encompassing documents by tags <HTML> and </HTML>. The tags <HTML> and </HTML> are used to enable a browser running on each client device 5 to recognize that the document encompassed by these tags is formed by an HTML language.

Between tags <head> and </head>, header information is described. For example, <meta http-equiv="refresh" content="60"> and a title ("Patent") of the presentation are included between the tags <head> and </head>. The <meta http-equiv="refresh" content="60"> is a commend instructing the browser of the client to read the HTML file repeatedly in the interval of 60 seconds. Between tags <title> and </title>, the title displayed in the title bar is included.

Between tags <body> and </body>, contents to be displayed on the client device 5 are included. More specifically, between the tags <body> and </body>, a filename of the image corresponding to the slide currently displayed on the screen 2 is described.

When the presentation showing process is started, the presenter's device 1 transmits the above mentioned HTML file to the host computer 4 (step S401). Then, the presenter's device 1 displays a currently selected image (i.e., a currently selected slide) on the presenter's device 1 (step S402). Then, the presenter's device 1 converts the image file corresponding to the currently selected slide into image data having a predetermined format (e.g., condensed image data having a JPEG file format), and transmits the image data to the host computer 4 (step S403).

At this stage, the client device 5 becomes able to brows the same image as that displayed on the screen 2 by accessing the HTML file and the image file designated in the HTML file in accordance with an URL which the client device 5 has obtained in advance.

After step S403 is finished, the presenter's device 1 waits until an action is conduced (S404-S407: NO). If no action is made (S404-S407: NO), the onscreen representation of the screen 2 stays unchanged. On the other hand, the client device 5 accesses the HTML file of the host computer 4 repeatedly because the HTML file which the client device 5 has obtained includes the above mentioned command instructing the client device 5 to read the HTML file repeatedly in the interval of 60 seconds. However, since the onscreen representation of the screen 2 stays unchanged, the displayed image of the browser of the client device 5 also stays unchanged.

If the presenter's device 1 is operated to switch the slide, for example, by pressing a downward arrow key (S404: YES) or by left-clicking a mouse attached to the presenter's device 1 (S405: YES), a next slide is displayed. In this case, the presenter's device 1 judges whether the currently displayed slide is the last slide (the last page) (step S412). If the currently displayed slide is the last slide (S412: YES), the onscreen representation returns to the start screen 10.

If the currently displayed slide is not the last slide (S412: NO), the next slide is selected as a slide to be displayed (step S413), and then control returns to step S402. In this case, the newly selected slide is displayed on the presenter's device 1 and the screen 2, the image file of the newly selected slide is converted to the image data, and the image data is transmitted to the host computer 4. The filename of the image data transmitted to the host computer 4 is equal to the filename of the image file contained in the HTML file. For example, an image file IM1 stored in the host computer 4 is replaced with an image file IM2 corresponding to the newly selected slide transmitted from the presenter's device 1 (see S403).

Since the received HTML file contains the command instructing the client device 5 to read the HTML file repeatedly in the interval of 60 seconds, the client device 5 accesses the image file of the host computer 4 designated in the HTML file again, and reads the image file stored in the host computer 4. In this case, the client device 5 obtains the image data newly stored in the host computer 4. Therefore, the client device 5 is able to display the same image as the image currently displayed on the screen 2.

If an upward arrow key is pressed on the presenter's device 1 (S406: YES), the immediately preceding slide is displayed. In this case, the presenter's device 1 judges whether the currently displayed slide is the first slide (step S414). If the currently displayed slide is the first slide (S414:YES), control returns to step S404 without changing the onscreen representation because in this case no slide to be switched is found. On the other hand, if the currently displayed slide is not the first slide (S414: NO), the immediately preceding slide is selected as the slide to be displayed (step S415).

Then, control returns to step S402. In this case, the newly selected slide is displayed on the presenter's device 1 and the screen 2, the image file corresponding to the newly selected slide is transmitted to the host computer 4. Therefore, the image file stored in the host computer 4 is replaced with the image file corresponding to the newly selected slide (see step S403).

Since the HTML file which the client device 5 has received contains the command instructing the client device 5 to read the HTML file repeatedly in the interval of 60 seconds, the client device 5 accesses the image file newly stored in the host computer 4 again to read the image file. That is, the client device 5 obtains the image file newly stored in the host computer 4. Therefore, the client device 5 is able to display the same image as the image currently displayed on the screen 2.

Figure 12:
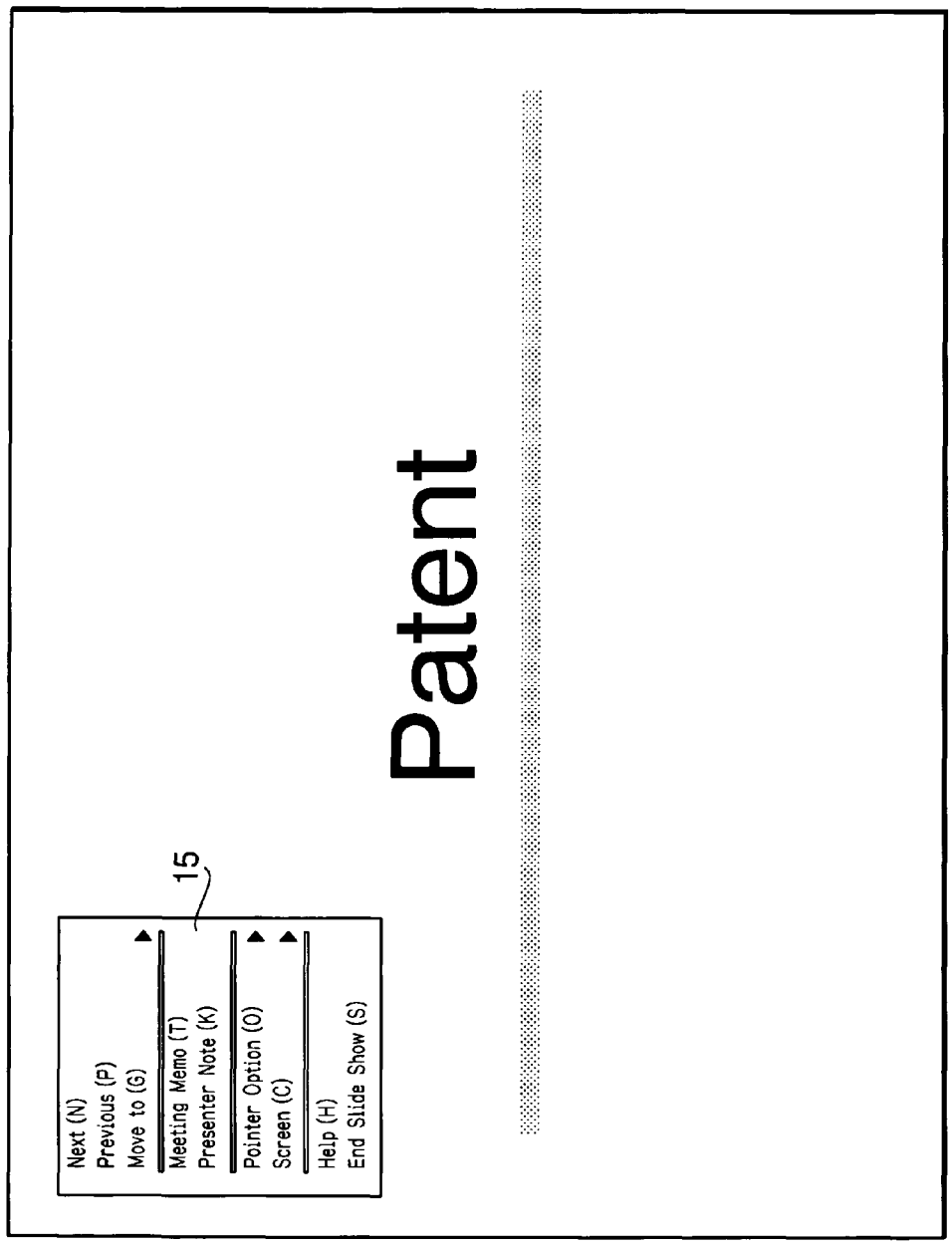
FIG. 12 illustrates a submenu displayed on an image of a slide show.

The switch of the slide is also conducted by clicking the right button of the mouse. If the right button of the mouse is clicked (S407: YES), a submenu 15 is displayed as shown in FIG. 12 (step S408). If an item "Next (N)" is clicked on the submenu 15 (S409: YES), steps S412, S413, S402 and S403 are processed. If an item "Previous (P)" is clicked on the submenu 15 (S410: YES), steps S414, S415, S402 and S403 are processed. If an item "Slide Shown (S)" is clicked on the submenu 15 (S411:YES), the onscreen representation returns to the start screen 10.

As described above, the presenter's device 1 according to the first embodiment creates the HTML file having the command instructing a client device to read the HTML file repeatedly in predetermined intervals, and stores the HTML file in the host computer 4. Further, each time the slide is switched on the presenter's device 1, the presenter's device 1 transmits the image file of the newly selected slide to the host computer 4 so that the image file stored in the host computer 4 is replaced with the newly transmitted image file. By this structure, the client device 5 is able to automatically switch the displayed image in accordance with the onscreen representation of the screen 2.

Such a configuration enables the participant to view the images (slides) of the presentation materials through the participant's client device 5 while listening to the presenter's lecture, without the need for operating manually the participant's client. Therefore, the participant is allowed to well focus on the presenter's lecture.

Second Embodiment

Hereafter, a second embodiment is described. Since the feature of the second embodiment corresponds to a variation of the presentation showing process shown in FIG. 4, in the following only the feature of the second embodiment is described.

Figure 5:
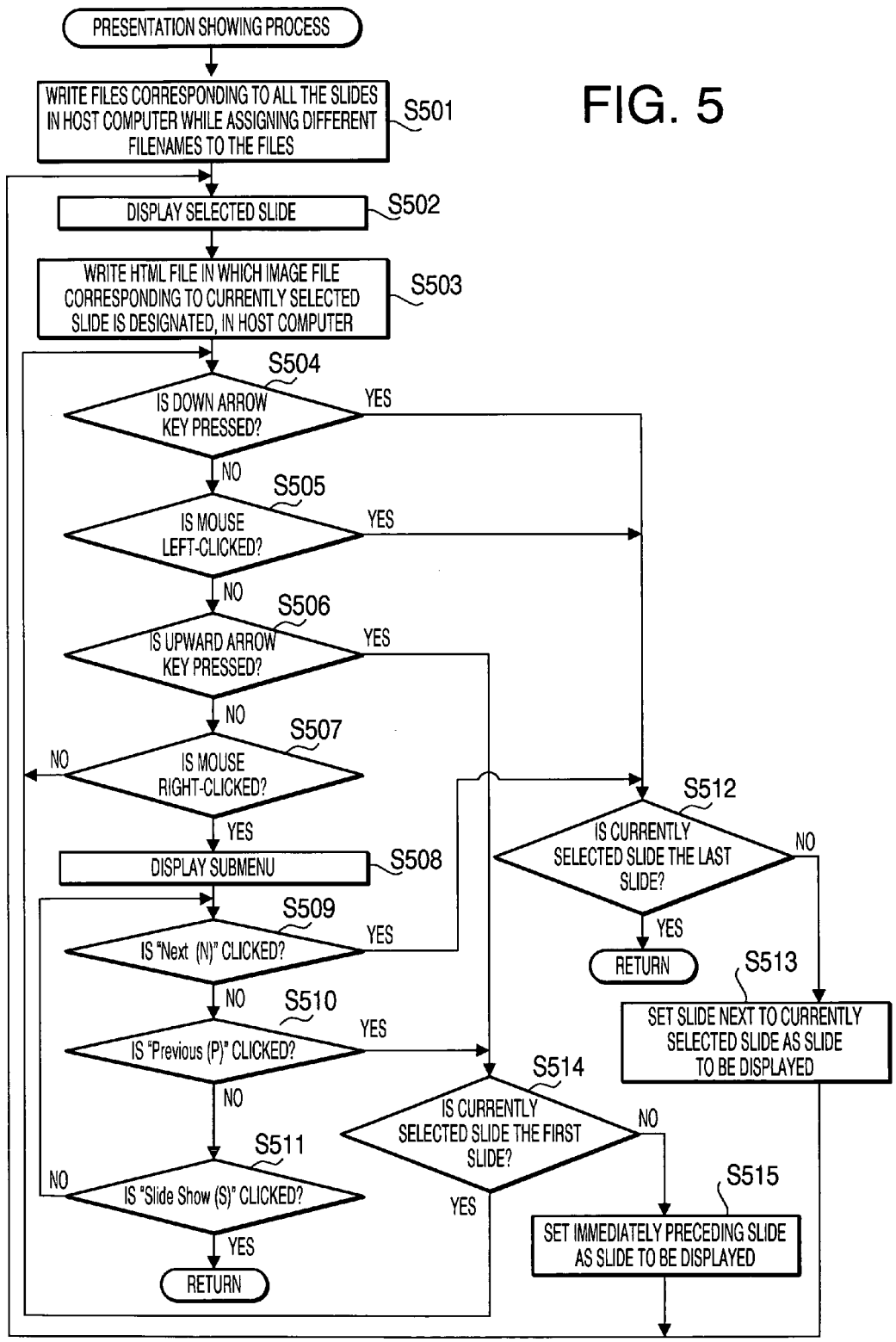
FIG. 5 is a flowchart illustrating the presentation showing process according to the second embodiment.

FIG. 5 is a flowchart illustrating a presentation showing process according to the second embodiment. In the presentation showing process according to the first embodiment, the presenter's device 1 operates to transmit the image data to the host computer 4 so that the image data in the host computer 4 is replaced with the newly transmitted image data in accordance with the progress of the representation of slides. By contrast, according to the second embodiment, the presenter's device 1 operates to store in advance the image files corresponding to all the slides in the host computer 4.

FIG. 11 illustrates an example of an HTML file to be transmitted to the host computer 4. As shown in FIG. 11, between tags <body> and </body>, a command <img src="filmslide3.jpg"> instructing the client device 5 to refer to image data (having a filename filmslide3.jpg) corresponding to the third slide of all of the slides is included. In the HTML file, a command instructing the client device 5 to read the HTML file repeatedly in the interval of 60 seconds is also included as in the case of the first embodiment.

After the slide show is started, the images files corresponding to all the slides are respectively converted into a plurality of pieces of image data having different filenames and the plurality of pieces of image data are transmitted to the host computer 4 (step S501). The presenter's device 1 displays a currently selected slide on the presenter's device 1 (i.e., on the screen 2) (step S502). Then, the presenter's device 1 transmits the HTML file in which the image file corresponding to the currently selected slide is designated (i.e., the HTML file containing the filename of the image data corresponding to the image file of the currently selected slide), to the host computer 4 (step S503). Typically, when the slide show is started, the first page (first slide) is selected. Therefore, in this stage, the first slide is displayed on the presenter's device 1 and the screen 2, the HTML file for requesting the client device 5 to refer to the image file corresponding to the first slide is transmitted to the host computer 4.

Consequently, the client device 5 becomes able to display the same image as the image displayed on the screen 2 by accessing the HTML file and the image file designated by the HTML file in accordance with an URL which the client device 5 has obtained in advance.

Then, the presenter's device 1 detects an action made by the presenter (steps S504-S507). If no action is detected (S504:NO, S505:NO, S506:NO and S507:NO), the onscreen representation of the screen 2 stays unchanged. On the other hand, the client device 5 accesses the image file in the host computer again because the HTML file which the client device 5 has obtained contains the command instructing the client device 5 to read the HTML file repeatedly in the interval of 60 seconds. However, since the onscreen representation of the slide stays unchanged, the image displayed on the client device 5 also stays unchanged.

If the downward arrow key of the keyboard of the presenter's device 1 is pressed (S504: YES) or the mouse of the presenter's device 1 is left-clicked (S505:YES), the next slide is displayed. In this case, the presenter's device 1 checks whether the currently displayed slide is the last slide (step S512). If the currently displayed slide is the last slide (S512: YES), the onscreen representation returns to the start screen 10. If the currently displayed slide is not the last slide (S512: NO), the next slide is selected as the slide to be displayed (step S513).

Then, control returns to step S502 so that the newly selected slide is displayed on the presenter's device 1 and the screen 2. In this case, the HTML file for requesting the client device 5 to refer to the image file corresponding to the newly selected slide is transmitted to the host computer 4. Consequently, the HTML file for requesting the client device 5 to refer to the image file corresponding to the previously selected slide is replaced with the HTML file for requesting the client device 5 to refer to the image file corresponding to the newly selected slide (see step S503).

As described above, the HTML file contains the command instructing the client device 5 to read the HTML file repeatedly in the interval of 60 seconds. Therefore, the client device 5 accesses the HTML file stored in the host computer 4 again. In this case, the image file designated in the newly accessed HTML files is different from the image file contained in the HTML file previously stored in the host computer 4. Consequently, the client device 5 which has obtained the new HTML file becomes able to display the same image as the image currently displayed on the screen 2.

If the upward arrow key is pressed on the presenter's device 1 (S506: YES), the image of the immediately preceding slide is displayed on the presenter's device 1. In this case, the presenter's device 1 judges whether the currently displayed slide is the first slide (step S514). If the currently displayed slide is the first slide (S514: YES), the onscreen representation of the presenter's device 1 stays unchanged because in this case no previous slide is found, and control returns to step S504. If the currently displayed slide is not the first slide (S514: NO), the immediately preceding slide is selected as the slide to be displayed (step S515).

Then, control returns to step S502. Consequently, the newly selected slide is displayed on the presenter's device 1 and the screen 2, and the HTML file for requesting the client device 5 to refer to the image file corresponding to the newly selected slide is transmitted to the host computer 4. In this case, the HTML file for requesting the client device 5 to refer to the image file corresponding to the previously selected slide is replaced with the HTML file for requesting the client device 5 to refer to the image file corresponding to the newly selected slide (see step S503).

As described above, the HTML file contains the command instructing the client device 5 to read the HTML file repeatedly in the interval of 60 seconds. Therefore, the client device 5 accesses the HTML file stored in the host computer 4 again. Consequently, the client device 5 which has obtained the new HTML file becomes able to display the same image as the image currently displayed on the screen 2.

If the mouse of the presenter's device 1 is right-clicked for the switching of slides (S507: YES), the submenu 15 is displayed as shown in FIG. 12 (step S508). If the item "Next(N)" is clicked (S509: YES), the above mentioned steps S512, S513, S502 and S503 are processed. If the item "Previous (P)" is clicked (S501: YES), the above mentioned steps S514, S515, S502 and S503 are processed. If the item "End Slide Show (S)" is clicked (S511: YES), the onscreen representation returns to the start screen 10.

As described above, the presenter's device 1 according to the first embodiment stores the image files of the presentation materials in advance in the host computer 4. The presenter's device 1 creates the HTML file having the command instructing a client device to read the HTML file repeatedly in predetermined intervals while changing the command in the HTML file so that the image file corresponding to the currently selected slide is designated in the HTML file, and stores the HTML file in the host computer 4. The client device 5 accesses the image file newly designated in the HTML file each time the onscreen representation of the screen 2 is switched. Such a configuration enables the client device 5 to automatically switch the slides in accordance with the progress of the onscreen representation of the screen 2.

Such a configuration enables the participant to view the images (slides) of the presentation materials through the participant's client device 5 while listening to the presenter's lecture, without the need for operating manually the participant's device 1. Therefore, the participant is allowed to well focus on the presenter's lecture.

Although the present invention has been described in considerable detail with reference to certain preferred embodiments thereof, other embodiments are possible.

For example, in the above mentioned example of the HTML file, the command is formed to instruct the client device 5 to read the HTML file repeatedly in the interval of 60 seconds. However, various lengths of intervals may be used for the command to be contained in the HTML file.

It should be noted that an HTML file provided from the presenter's device 1 to the host computer 4 is an example of information formed of a mark-up language. Information formed of another type of mark-up language may be used in place of an HTML file.

What is claimed is:

1. A presenter device, comprising:
   a display unit on the presenter device configured to display at least one of a plurality of data files;
   a first information providing unit on the presenter device configured to transmit to a host computer which is separate and distinct from the presenter device, a first information file coded in a markup language, the first information file including a command instructing a client device, separate and distinct from the presenter device, to access the host computer to reread the first information file after a preset time interval, and a predetermined filename coded within the first information file, the predetermined filename representing an image file to be displayed, the first information file configured to be read by the client device containing code causing the client device to download and display an image file having the predetermined filename;
   a display switch unit on the presenter device configured to switch onscreen representation on the display unit between the plurality of data files;
   a file generation unit on the presenter device configured to generate a display image file corresponding to one of the plurality of data files being currently displayed on the display unit when the onscreen representation on the display unit has been switched; and
   a second information providing unit on the presenter device configured to transmit the display image file generated by the file generation unit to the host computer when the onscreen representation on the display unit has been switched;
   wherein the second information providing unit transmits the display image file to the host computer as a newly displayed image file, and assigns the same predetermined filename to the newly displayed image file, replacing any previous file having the predetermined filename, the code in the first information file causing the client device to display the newly displayed image file having the same predetermined file name when the first information file is reread from the host computer after the preset time interval.

2. The presenter device according to claim 1, further comprising a data conversion unit on the presenter device configured to convert each of the plurality of data files into image data.

3. A method to be implemented on a presenter device, comprising the steps of:
   controlling a display unit on the presenter device to display at least one of a plurality of data files;
   transmitting by the presenter device, to a host computer which is separate and distinct from the presenter device, a first information file coded in a markup language, the first information file including a command instructing a client device, separate and distinct from the presenter device, to access the host computer to reread the first information file after a preset time interval and a predetermined filename coded within the first information file, the predetermined filename representing an image file to be displayed, the first information file configured to be read by the client device containing code causing the client device to download and display an image file having the predetermined filename;
   switching by the presenter device onscreen representation on the display unit between the plurality of data files;
   generating by the presenter device a display image file corresponding to one of the plurality of data files being currently displayed on the display unit when the onscreen representation on the display unit has been switched; and
   transmitting by the presenter device the display image file to the host computer when the onscreen representation on the display unit has been switched;
   wherein the display image file is transmitted to the host computer as a newly displayed image file having the predetermined filename assigned as the filename of the newly displayed image file, replacing any previous file having the predetermined filename, the code in the first information file causing the client device to display the newly displayed image file having the same predetermined file name when the first information file is reread from the host computer after the preset time interval.

4. The method according to claim 3, wherein each of the first information file and the newly displayed data file is formed of a mark-up language.

5. A computer readable medium having computer readable instruction stored thereon, which, when executed by a processor of a presenter device, configures the processor to perform the steps of:
   controlling a display unit on the presenter device to display at least one of a plurality of data files;
   transmitting, to a host computer, which is separate and distinct from the presenter device, a first information file coded in a markup language, the first information file including a command instructing a client device, separate and distinct from the presenter device, to access the host computer to reread the first information file after a preset time interval and a predetermined filename coded within the first information file, the predetermined filename representing an image file to be displayed, the first information file configured to be read by the client device containing code causing the client device to download and display an image file having the predetermined filename;
   switching onscreen representation on the display unit between the plurality of data files;
   generating a display image file corresponding to one of the plurality of data files being currently displayed on the display unit when the onscreen representation on the display unit has been switched; and
   transmitting the display image file to the host computer when the onscreen representation on the display unit has been switched;
   wherein the display image file is transmitted to the host computer as a newly displayed image file having the predetermined filename assigned as the filename of the newly displayed image file, replacing any previous file having the predetermined filename, the code in the first information file causing the client device to display the newly displayed image file having the same predetermined file name when the first information file is reread from the host computer after the preset time interval.

* * * * *